J. W. SANDLIN.
PUMP VALVE.
APPLICATION FILED NOV. 14, 1919.

1,365,856.

Patented Jan. 18, 1921.

INVENTOR
James W. Sandlin
BY
Haraway & Cathey
ATTORNEYS

UNITED STATES PATENT OFFICE.

JAMES W. SANDLIN, OF HUMBLE, TEXAS.

PUMP-VALVE.

1,365,856.

Specification of Letters Patent.  Patented Jan. 18, 1921.

Application filed November 14, 1919. Serial No. 338,028.

*To all whom it may concern:*

Be it known that I, JAMES W. SANDLIN, citizen of the United States, residing at Humble, in the county of Harris and State of Texas, have invented certain new and useful Improvements in Pump-Valves, of which the following is a specification.

This invention relates to new and useful improvements in a pump valve.

One object of the invention is to provide a valve of the character described which is designed to be used in a pump, used in pumping wells, particularly oil wells, and which is so constructed that the wear on the valve and seat will be uniform, thus causing the valve at all times to seat perfectly.

With the above and other objects in view, the invention has particular relation to certain novel features of construction, operation and arrangement of parts, an example of which is given in this specification and illustrated in the accompanying drawings, wherein.

Figure 1:
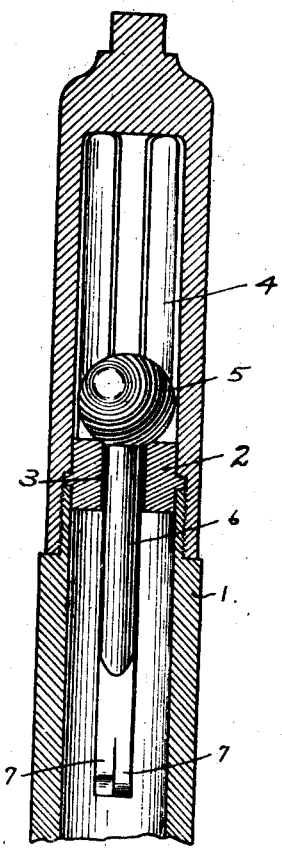
Figure 1, is a vertical sectional view of the valve.
Figure 2:
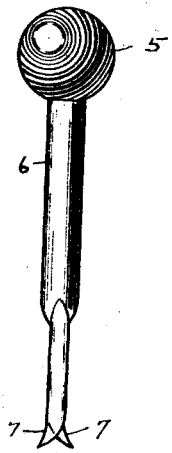
Fig. 2, is a side view.
Figure 3:
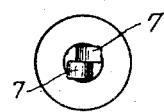
Fig. 3, is a bottom end view.

Referring now more particularly to the drawings wherein like numerals of reference designate similar parts in each of the figures, the numeral 1, refers to the working barrel, whose upper end carries the valve seat 2, having the central fluid passageway 3. This seat is retained in position by means of the valve cage 4, which is threaded on to the upper end of the working barrel, and which clamps said seat in position. The lower end of the pump rod (not shown) is attached to the cage 4, and through this rod, said working barrel is reciprocated up and down. Within the cage 4, there is a ball valve 5, which controls the passageway 3, and this valve has the depending stem 6, extending down through the fluid passageway 3, and the lower end of this stem is flattened and slotted forming fins 7, 7, which are oppositely beveled. As the fluid passes under pressure through the barrel 1, it operates against the oppositely beveled fins 7, to rotate the same, thus rotating the valve 5, slowly and causing it to wear uniformly and to thus at all times seat perfectly and prevent leakage through the valve.

What I claim is:

1. In a pump, a working barrel, a valve seat having a fluid passageway, a valve controlling said passageway, a stem fixed to the valve and extending down through said passageway, whose lower end is flattened and formed into the oppositely beveled fins and a cage inclosing the valve.

2. In a pump, a valve seat having a fluid passageway therethrough a ball valve controlling said passageway, a cage inclosing the valve and two oppositely beveled fins depending from the valve, and actuated by the fluid passing through the pump to rotate the valve.

In testimony whereof I have signed my name to this specification in the presence of two subscribing witnesses.

JAMES W. SANDLIN.

Witnesses:
 E. V. HARDWAY,
 ALBERTA ALLEN.